United States Patent
Baba

(10) Patent No.: US 11,347,628 B2
(45) Date of Patent: May 31, 2022

(54) TEST CASE GENERATION APPARATUS, TEST CASE GENERATION METHOD, AND COMPUTER READABLE MEDIUM

(71) Applicant: Mitsubishi Electric Corporation, Tokyo (JP)

(72) Inventor: Madoka Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 66 days.

(21) Appl. No.: 16/961,395

(22) PCT Filed: Jan. 17, 2018

(86) PCT No.: PCT/JP2018/001227
§ 371 (c)(1),
(2) Date: Jul. 10, 2020

(87) PCT Pub. No.: WO2019/142266
PCT Pub. Date: Jul. 25, 2019

(65) Prior Publication Data
US 2020/0364137 A1    Nov. 19, 2020

(51) Int. Cl.
*G06F 9/44*        (2018.01)
*G06F 11/36*        (2006.01)

(52) U.S. Cl.
CPC ...... *G06F 11/3688* (2013.01); *G06F 11/3676* (2013.01); *G06F 11/3684* (2013.01); *G06F 11/3692* (2013.01)

(58) Field of Classification Search
CPC ............ G06F 11/3688; G06F 11/3676; G06F 11/3684; G06F 11/3692
See application file for complete search history.

(56) References Cited

U.S. PATENT DOCUMENTS

2005/0216248 A1* 9/2005 Ciolfi ............... G06F 30/20
                                                            703/22
2009/0271661 A1  10/2009 Miyai et al.
(Continued)

FOREIGN PATENT DOCUMENTS

DE    11 2016 006 297 T5    10/2018
JP             5-151023 A       6/1993
(Continued)

OTHER PUBLICATIONS

International Search Report for PCT/JP2018/001227 (PCT/ISA/210) dated Apr. 17, 2018.
(Continued)

*Primary Examiner* — Chat C Do
*Assistant Examiner* — Lenin Paulino
(74) *Attorney, Agent, or Firm* — Birch, Stewart, Kolasch & Birch, LLP

(57) ABSTRACT

A test case generation apparatus (10) analyzes test target software that is software to execute the process of one step for each input of a value, thereby generating, as a test case, a sequence of values that are input for a test of the software. In that case, an equivalent step checking unit (19) determines that when the value of a state variable after execution of one of a plurality of steps that share the state variable and the value of the state variable after execution of a different step are equal with respect to the state variable, those two steps are equivalent steps. A test case generation unit (20) analyzes the test target software, excluding one of the two steps determined to be the equivalent step by the equivalent step checking unit (19), thereby generating the value to be included in the test case.

6 Claims, 12 Drawing Sheets

(56) References Cited

U.S. PATENT DOCUMENTS

| | | |
|---|---|---|
| 2016/0196156 A1 | 7/2016 | Kuwamura et al. |
| 2017/0161180 A1* | 6/2017 | Raghavan ........... G06F 11/3684 |
| 2018/0095867 A1* | 4/2018 | Varadarajan ........ G06F 11/3688 |
| 2019/0018765 A1* | 1/2019 | Isoda .................. G06F 11/3676 |

FOREIGN PATENT DOCUMENTS

| | | |
|---|---|---|
| JP | 11-219293 A | 8/1999 |
| JP | 2003-316612 A | 11/2003 |
| JP | 2009-265810 A | 11/2009 |
| JP | 2011-8628 A | 1/2011 |
| JP | 2014-63415 A | 4/2014 |
| JP | 5987189 B2 | 9/2016 |
| WO | WO 2015/045472 A1 | 4/2015 |

OTHER PUBLICATIONS

German Office Action dated Oct. 15, 2021 for Application No. 11 2018 006 331.3 with an English translation.

\* cited by examiner

Fig. 4

```
PROGRAM int d, cnt;
void func_init(){
 d = 0;
 cnt = 1;
} void func(int b, int c){
 ...(OMITTED)...
 a = b + c;
 if(cnt > 2){
  if(a){
   d = RUN;
  }
  else{
   d = READY;
  }
 }
 else{
  cnt++;
 }
 ...(OMITTED)...
}
```

Fig. 5

PROGRAM

```
int d, cnt;
void func_init(){
 d = 0;
 cnt = 1;
} void func(int b, int c){
 ...(OMITTED)...
 a = b + c;
 if(cnt > 2){
  // P1
  if(a){
   // P2
   d = RUN;
  }
  else{
   // P3
   d = READY;
  }
 }
 else{
  // P4
  cnt++;
 }
 ...(OMITTED)...
}
```

Fig. 6

```
WRAPPER FUNCTION void wrap(){
 func_init();

func(b_1, c_1); /* FIRST STEP */
 VAR_1 = d;

func(b_2, c_2); /* SECOND STEP */
 VAR_2 = d;

func(b_3, c_3); /* THIRD STEP */
 VAR_3 = d;

func(b_4, c_4); /* FOURTH STEP */
 VAR_4 = d;

ASSERT(VAR_1 == VAR_2);
 ASSERT(VAR_2 == VAR_3);
 ASSERT(VAR_3 == VAR_4);
}
```

Fig. 9

PROGRAM

```
int d, cnt;
void func_init(){
 a = 0;
 d = 0;
} void func(int b, int c){
 ...(OMITTED)...
 a = a * 0.8 + (b + c) * 0.2;
 if(a > 100){
  d = RUN;
 }
 else{
  d = READY;
 }
 ...(OMITTED)...
}
```

Fig. 10

PROGRAM

```
int d, cnt;
void func_init(){
 a = 0;
 d = 0;
} void func(int b, int c){
 ...(OMITTED)...
 a = a * 0.8 + (b + c) * 0.2;
 if(a > 100){
  // P1
  d = RUN;
 }
 else{
  // P2
  d = READY;
 }
 ...(OMITTED)...
}
```

Fig. 11

WRAPPER FUNCTION

```
void wrap(){
 func_init();

func(b_1, c_1); /* FIRST STEP */
 VAR_1 = d;
 CTRL_1 = a;

func(b_2, c_2); /* SECOND STEP */
 VAR_2 = d;
 CTRL_2 = a;

func(b_3, c_3); /* THIRD STEP */
 VAR_3 = d;
 CTRL_3 = a;

func(b_4, c_4); /* FOURTH STEP */
 VAR_4 = d;
 CTRL_4 = a;

func(b_5, c_5); /* FIFTH STEP */
 VAR_5 = d;
 CTRL_5 = a;

ASSERT(VAR_1 == VAR_2);
 ASSERT(VAR_1 == VAR_3);
 ASSERT(VAR_1 == VAR_4);
 ASSERT(VAR_1 == VAR_5);
 ASSERT(VAR_2 == VAR_3);
 ASSERT(VAR_2 == VAR_4);
 ASSERT(VAR_2 == VAR_5);
 ASSERT(VAR_3 == VAR_4);
 ASSERT(VAR_3 == VAR_5);
 ASSERT(VAR_4 == VAR_5);
```

Fig. 12

WRAPPER FUNCTION (CONTINUED)

```
ASSERT(CTRL_1 == CTRL_2);
ASSERT(CTRL_1 == CTRL_3);
ASSERT(CTRL_1 == CTRL_4);
ASSERT(CTRL_1 == CTRL_5);
ASSERT(CTRL_2 == CTRL_3);
ASSERT(CTRL_2 == CTRL_4);
ASSERT(CTRL_2 == CTRL_5);
ASSERT(CTRL_3 == CTRL_4);
ASSERT(CTRL_3 == CTRL_5);
ASSERT(CTRL_4 == CTRL_5);
}
```

TEST CASE GENERATION APPARATUS, TEST CASE GENERATION METHOD, AND COMPUTER READABLE MEDIUM

TECHNICAL FIELD

The present invention relates to a test case generation apparatus, a test case generation method, and a test case generation program.

BACKGROUND ART

Embedded real-time software for performing various controls is installed in a control apparatus for an automobile, an industrial robot, or the like. A malfunction of the software as mentioned above could lead to a fatal accident. Therefore, it is necessary to carry out an appropriate test before shipment. Each of ISO26262, which is a functional safety standard for automobiles and DO-178C, which is a functional safety standard for aircrafts, for example, requires that a test method and so on to be adopted for each test step be defined as test requirements, and that a test be carried out according to these test requirements. As an example of the test requirements for a unit test, it is required that, by generating a test case based on equivalence partitioning or boundary value analysis, the test be executed so that a request is covered, and it is required at the same time that the test case cover the structure of a source code of test target software. In the structure of the source code, each instruction line describing a process, or each branch that is expressed by one of an if statement, a for statement, and like so on, or the like is used as a criterion. The criterion to be used differs according to the test target software. This criterion is referred to as a structural coverage criterion. When the instruction line is used as the structural coverage criterion, an instruction coverage rate, which indicates how many codes that are included in the test target software have been executed according to the test case, is measured. When the branch that is expressed by the if statement or the like is used as the structural coverage criterion, a branch coverage rate, which indicates whether every branching destination that is included in the codes has been executed, is measured. If the instruction coverage rate or the branch coverage rate is sufficiently high, it is determined that the test is appropriate.

Generally, embedded real-time software has a plurality of states such as an initial state, an execution state, and a termination preparation state. In such software, the structure of a source code cannot be covered just by an input of a test case for one time, so that test case inputs for a plurality of times may become necessary. An execution unit of test target software is referred to as a step. For example, the input of the test case for the one time is one step.

In recent years, the source code of the embedded real-time software has increased in size and has become complex. Therefore, an increase in the number of steps for manually generating a test case extending over a plurality of steps to cover the structure of the source code while satisfying the requirement specification of the software has become a problem.

Patent Literature 1 discloses a method of automatically generating a test case extending over a plurality of steps for a unit test in order to accommodate an increase of the number of the steps.

Patent Literature 2 discloses a method of reducing the number of times of repetition if there is no change in a process by that repetition, in a portion of a benchmark program where the same process is repetitively performed.

Patent Literature 3 discloses a method of speeding up simulation. In this method, if the internal state of a certain processor before execution of a processing block remains unchanged from that when the processing block previously became a processing target, the process of the processing block is not performed, and information obtained in the previous time is utilized, thereby speeding up the simulation.

CITATION LIST

Patent Literature

Patent Literature 1: JP 2014-063415 A
Patent Literature 2: JP 2003-316612 A
Patent Literature 3: WO2015-045472 A

SUMMARY OF INVENTION

Technical Problem

In the method in Patent Literature 1, it is analyzed by bounded model checking whether the test case, which sequentially satisfies test requirements from a first step until reaching the maximum number of the steps set in advance, can be generated. If there is a request or a branch that has not been covered, the number of the steps is incremented to repeat the analysis for the generation of the test case. Assume that this method has been applied to software configured to stand by for a certain period of time until a state transition occurs. In that case, a state change does not occur during the standby even if whatever input has been performed. Thus, a new structure is not covered. As a result, a new test case is not generated in a step corresponding to the standby even if analysis for test case generation is performed. An analysis time to be taken by the bounded model checking tends to increase exponentially due to an increase of the number of steps. Therefore, the analysis time may increase, so that a period of time for the test case generation may not stay within a practical time even if the new test case is not generated. In order to reduce this analysis time, a method may be considered which intentionally changes a value of a counter configured to count a standby time to a small value, thereby reducing the number of the steps necessary for the test generation. However, in order to change the counter value to an appropriate value before the occurrence of the state transition, details of specification information must be grasped. When a plurality of standby times are provided, the counter value may be set to an erroneous value and as a result, a test case for the software whose behavior has been altered to be different from what to expect may be generated.

In the method in Patent Literature 2, it is determined whether or not a change in an internal state is present, in a specific execution environment. It is not taken into consideration whether a certain process is determined to constantly have no internal state change, in an environment where an external input changes.

In the method in Patent Literature 3, even if an input value is included in an internal state before execution of a processing block, processes using that processing block are determined to be equivalent only in the internal state including a specific input value. Therefore, when an input value for a previous step and an input value for a current step are different, processes of the previous step and the current step cannot be determined to be equivalent.

As described above, the conventional methods cannot be applied to generation of a test case extending over a plurality of steps for software such as embedded real-time software where an input from an external apparatus changes between the steps.

An object of the present invention is to reduce a time to be taken for generation of a test case extending over a plurality of steps.

Solution to Problem

A test case generation apparatus according to an aspect of the present invention is a test case generation apparatus to analyze software to execute a process of one step for each input of a value, thereby generating, as a test case, a sequence of values that are input for a test of the software. The test case generation apparatus may include:

an equivalent step checking unit to determine that, with respect to a state variable that is shared among processes of a plurality of steps and holds a value according to an execution result of a process in each step as the processes of the plurality of steps are sequentially executed, when the value of the state variable after execution of one of the plurality of steps and the value of the state variable after execution of a different step are equal, those two steps are equivalent steps; and a test case generation unit to analyze the software excluding one of the two steps determined to be the equivalent steps by the equivalent step checking unit, thereby generating the value to be included in the test case.

Advantageous Effects of Invention

In the present invention, a process of generating the value to be included in the test case by analyzing the software is omitted for the one of the two steps determined to be the equivalent steps. Therefore, a time to be taken for the generation of the test case extending over the plurality of steps can be reduced.

BRIEF DESCRIPTION OF DRAWINGS

FIG. 4 is a diagram illustrating the program of test target software according to the first embodiment.

FIG. 5 is a diagram illustrating coverage target portions that are included in the program of the test target software according to the first embodiment.

FIG. 6 is a diagram illustrating a wrapper function that is generated by a wrapper function generation unit of the test case generation apparatus according to the first embodiment.

FIG. 9 is a diagram illustrating the program of test target software according to the second embodiment.

FIG. 10 is a diagram illustrating coverage target portions that are included in the program of the test target software according to the second embodiment.

FIG. 11 is a diagram illustrating a wrapper function that is generated by a wrapper function generation unit of the test case generation apparatus according to the second embodiment.

FIG. 12 is a diagram illustrating the wrapper function that is generated by the wrapper function generation apparatus according to the second embodiment.

DESCRIPTION OF EMBODIMENTS

Figure 1:
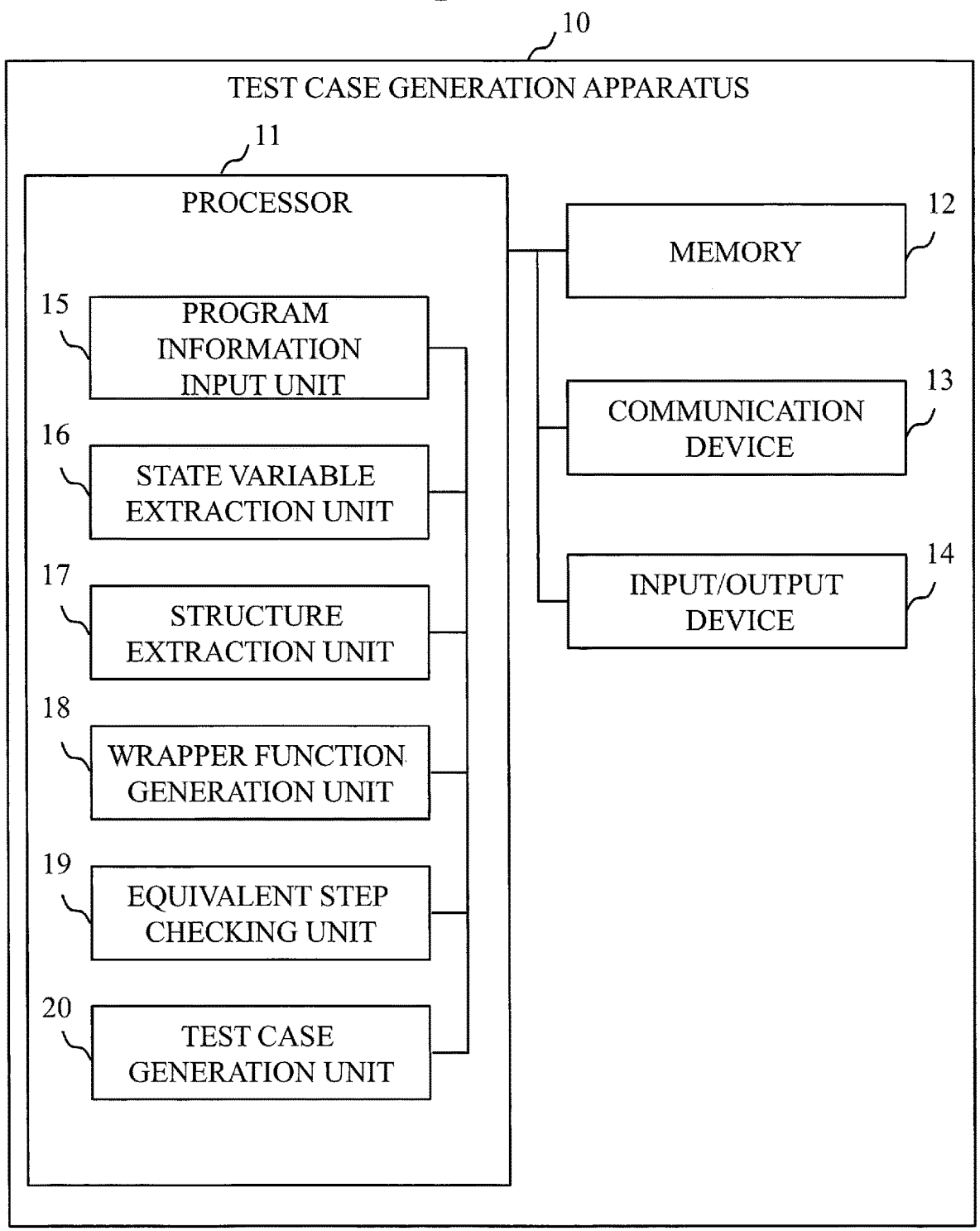
FIG. 1 is a block diagram illustrating a configuration of a test case generation apparatus according to a first embodiment.

Hereinafter, embodiments of the present invention will be described, using the drawings. A same reference numeral is given to the same or equivalent portions in the respective drawings. In the description of the embodiments, explanation of the same or equivalent portions will be suitably omitted or simplified. The present invention is not limited to the embodiments that will be described below, and various modifications are possible as required. For example, two or more embodiments among the embodiments that will be described below may be carried out in combination. Alternatively, one embodiment or a combination of two or more embodiments among the embodiments that will be described below may be partially carried out.

First Embodiment

This embodiment will be described, using FIGS. 1 to 6.
*Description of Configuration*
A configuration of a test case generation apparatus 10 according to this embodiment will be described with reference to FIG. 1.

The test case generation apparatus 10 is a computer. The test case generation apparatus 10 includes a processor 11 and includes other hardware such as a memory 12, a communication device 13, and an input/output device 14. The processor 11 is connected to the other hardware through signal lines and controls these other hardware.

The test case generation apparatus 10 includes a program information input unit 15, a state variable extraction unit 16, a structure extraction unit 17, and a wrapper function generation unit 18, an equivalent step checking unit 19, and a test case generation unit 20, as functional elements. Functions of the program information input unit 15, the state variable extraction unit 16, the structure extraction unit 17, and the wrapper function generation unit 18, the equivalent step checking unit 19, and the test case generation unit 20 are implemented by software.

The processor 11 is a device to execute a test case generation program. The test case generation program is a program to implement the functions of the program information input unit 15, the state variable extraction unit 16, the structure extraction unit 17, the wrapper function generation unit 18, the equivalent step checking unit 19, and the test case generation unit 20. The processor 11 is a CPU, for example. "CPU" is an abbreviation for Central Processing Unit.

The memory 12 is a device to store the test case generation program. The memory 12 is a RAM, a flash memory, or a combination of these memories, for example. "RAM" is an abbreviation for Random Access Memory. The program of test target software and specification information of the test target software are also stored in the memory 12. Though the test target software may be software of an arbitrary type, the test target software in this embodiment is embedded software.

The communication device 13 includes a receiver to receive data that is input to the test case generation program and a transmitter to transmit data that is output from the test case program. The communication device 13 is a communication chip or an NIC, for example. "NIC" is an abbreviation for Network Interface Card.

The input/output device 14 is connected to an input device to be operated by a user for input of the data to the test case generation program and a display to display, on a screen, the data that is output from the test case generation program. The input device is a mouse, a keyboard, a touch panel, or a combination of some or all of these devices. The display is an LCD, for example. "LCD" is an abbreviation for Liquid Crystal Display. The display is in particular used for displaying a test case generated by the test case generation unit 20.

The test case generation program is loaded into the processor 11 from the memory 12 and is then executed by the processor 11. An OS as well as the test case generation program is stored in the memory 12. "OS" is an abbreviation for "Operating System". The processor 11 executes the test case generation program while executing the OS. A part or all of the test case generation program may be incorporated into the OS.

The test case generation program and the OS may be stored in an auxiliary storage device. The auxiliary storage device is an HDD, a flash memory, or a combination of these memories, for example. HDD is an abbreviation for Hard Disk Drive. When the test case generation program and the OS are stored in the auxiliary storage device, the test case generation program and the OS are loaded into the memory 12 and are then executed by the processor 11.

The test case generation apparatus 10 may include a plurality of processors that substitute the processor 11. These plurality of processors share execution of the test case generation program. Each processor is a CPU, for example.

Data, information, signal values, and variable values that are used, processed, or output by the test case generation program are stored in the memory 12, the auxiliary storage device, or a register or a cache memory in the processor 11.

The test case generation program is a program to cause a computer to execute processes to be performed by the program information input unit 15, the state variable extraction unit 16, the structure extraction unit 17, the wrapper function generation unit 18, the equivalent step checking unit 19, and the test case generation unit 20 as a program information input process, a state variable extraction process, a structure extraction process, a wrapper function generation process, an equivalent step checking process, and a test case generation process, respectively. The test case generation program may be recorded in a computer-readable medium and then may be provided, may be stored in a recording medium and then may be provided, or may be provided as a program product.

The test case generation apparatus 10 may be constituted from one computer, or a plurality of computers. When the test case generation apparatus 10 is constituted from the plurality of computers, the functions of the program information input unit 15, the state variable extraction unit 16, the structure extraction unit 17, the wrapper function generation unit 18, the equivalent step checking unit 19, and the test case generation unit 20 may be distributed into the respective computers and then may be implemented.

\*\*\*Description of Operations\*\*\*

An overview of operations of the test case generation apparatus 10 according to this embodiment will be described with reference to FIG. 1. The operations of the test case generation apparatus 10 correspond to a test case generation method according to this embodiment.

The program information input unit 15 loads, from the memory 12, the program of the test target software, counter specification information, input specification information and information of the maximum number of steps, or loads, from an outside, the program of the test target software, the counter specification information, the input specification information, and the information of the maximum number of the steps via the communication device 13 or the input/output device 14.

The state variable extraction unit 16 analyzes the program loaded by the program information input unit 15, extracts state variables included in the program, and then stores the state variables in the memory 12. Each state variable is a variable such as a global variable to be held between steps even when a program has been executed over the multiple steps. That is, the state variable is a variable that is shared among processes of the multiple steps and holds a value according to the execution result of a process in each step as the processes in the multiple steps are sequentially executed. This state variable stores a value indicating a mode, such as an initial state or a normal state. The state variable extraction unit 16 distinguishes, among the extracted state variables, the variable that has a role of a counter, based on the counter specification information loaded by the program information input unit 15. Thereafter, the state variables excluding the counter will be referred to as a checking target state variable VAR. The number of the state variables may be two or more. If a plurality of checking target state variables are present, the VAR indicates a group of the variables.

Though the program of the test target software is analyzed to extract the state variables by the state variable extraction unit 16, state variable list information may be loaded from the outside.

The structure extraction unit 17 extracts one or more target portions to be covered, which are included in the program loaded by the program information input unit 15, according to a structural coverage criterion to be used for a test.

The wrapper function generation unit 18 calls the test target program and generates a wrapper function for storing the value of the checking target state variable after execution of each step as a variable that is different for each step. It is assumed in this embodiment that the variable that has stored the value of the checking target state variable after execution of an Xth step is indicated by VAR_X.

The equivalent step checking unit 19 checks whether execution of a certain step and execution of an immediately preceding step are functionally equivalent, by a formal method. If the VAR_X after execution of a certain step X and VAR_(X−1) after execution of step (X−1) constantly have the same value, the equivalent step checking unit 19 determines that step X and step (X−1) are equivalent steps. It is assumed, however, that X is a value not less than two and not more than the maximum number of the steps.

The test case generation unit 20 generates a test case configured to cover the one or more coverage targets extracted by the structure extraction unit 17 according to a result obtained by the equivalent step checking unit 19, and outputs the test case.

Figure 2:
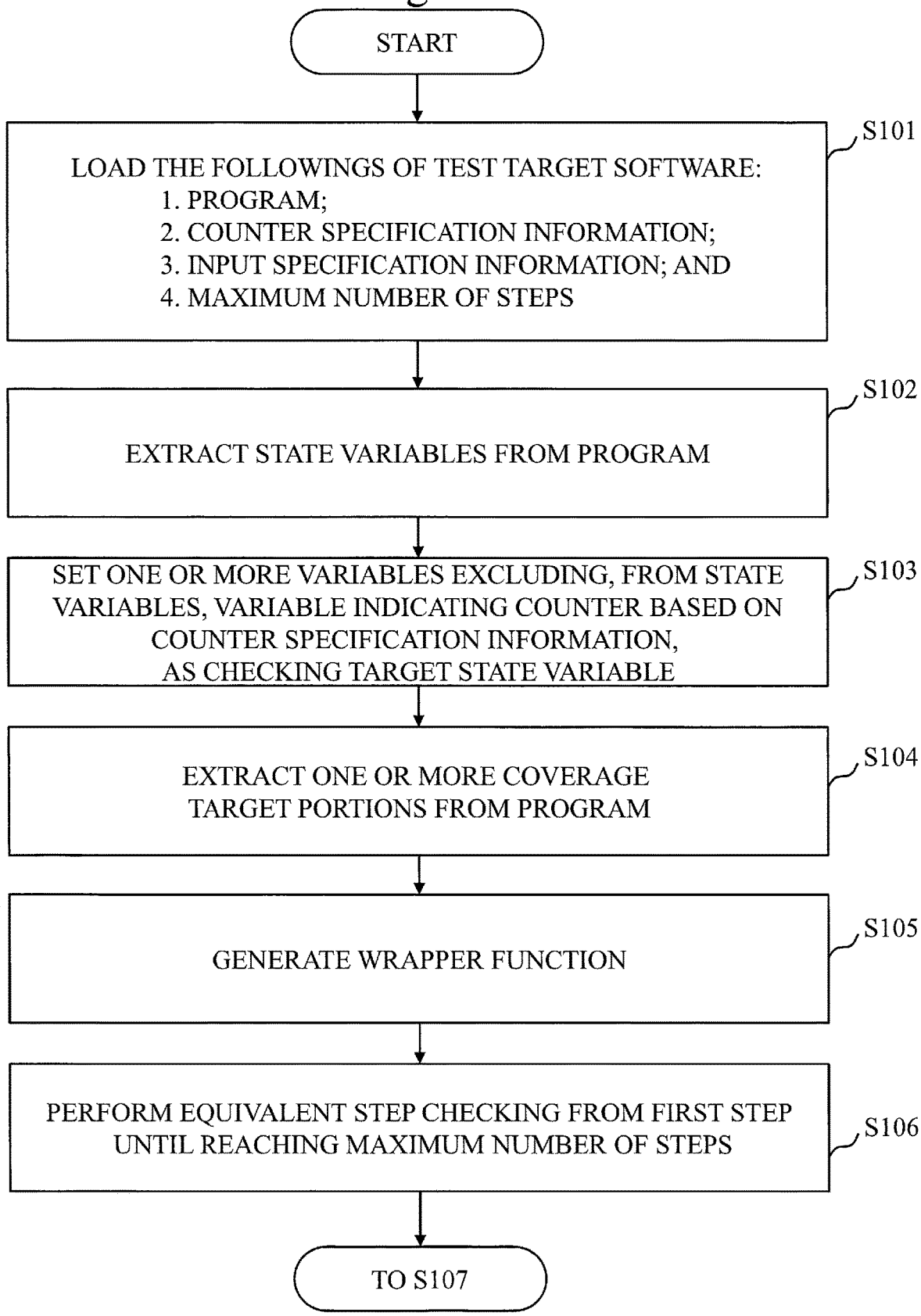
FIG. 2 is a flowchart illustrating operations of the test case generation apparatus according to the first embodiment.
Figure 3:
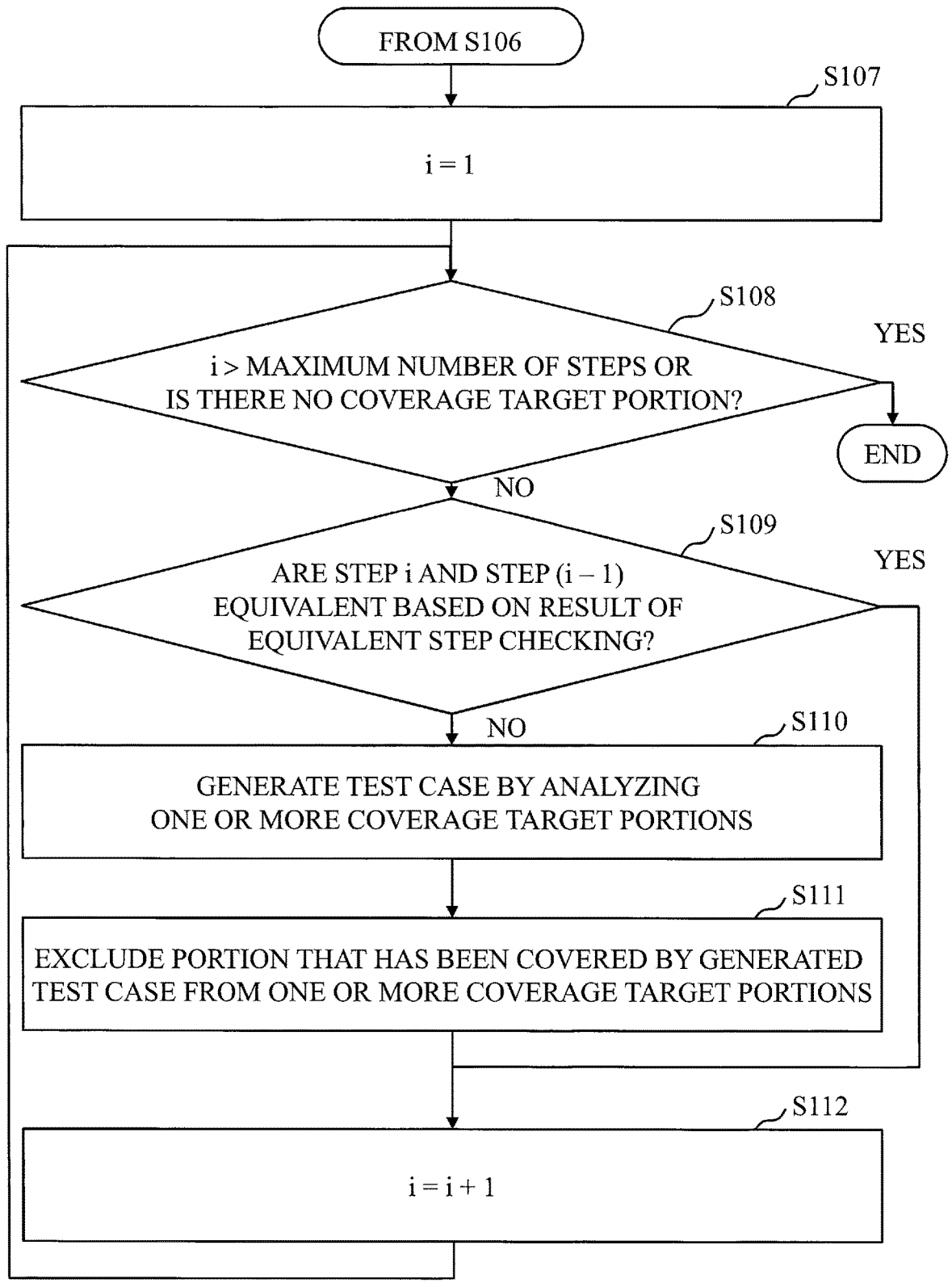
FIG. 3 is a flowchart illustrating operations of the test case generation evaluation apparatus according to the first embodiment.

Details of the operations of the test case generation apparatus 10 according to this embodiment will be described with reference to FIGS. 2 and 3.

In step S101, the program information input unit 15 loads the program of the test target software, the counter specification information, the input specification information, and the information of the maximum number of the steps, and then proceeds to step S102. The counter specification information and the input specification information can be manually set by a user based on a software specification, can be automatically set, using a specification described in a defined format, or can be set by analyzing the program to automatically select a variable that is used as a trigger for a state transition. The maximum number of the steps is the number of the steps necessary for covering the program of the test target software, and it is assumed in this embodiment that the maximum number of the steps is extracted like the counter specification information and so on.

In step S102, the state variable extraction unit 16 analyzes the loaded program, extracts the state variables that are included in the program, and proceeds to step S103.

In step S103, the state variable extraction unit 16 sets, out of the extracted state variables, one or more variables excluding the counter indicated by the counter specification information, as the checking target state variable, and then proceeds to step S104.

In step S104, the structure extraction unit 17 extracts the one or more coverage target portions that are included in the program of the test target software, according to the structural coverage criterion to be used, and then proceeds to step S105. When each branch is used as the structural coverage criterion for execution of the test and a branch coverage rate is measured, the structure extraction unit 17 extracts each branch included in the program in step S104. For example, when an if statement is used, two portions that are a case determined to be TRUE and a case determined to be FALSE are extracted as the coverage targets. Since step S104 has no dependency with each of step S102, step S103, and step S105, step S104 can be executed by changing the execution order of step S104 or can be executed in parallel with one of step S102, step S103, and step S105.

In step S105, the wrapper function generation unit 18 generates the wrapper function for the equivalent step checking, and then proceeds to step S106.

In step S106, the equivalent step checking unit 19 checks equivalence between the steps by the formal method, using the wrapper function as an entry function. Specifically, the equivalent step checking unit 19 checks whether or not values of the checking target state variable VAR_X after the execution of step X and the checking target state variable VAR_(X−1) after the execution of step (X−1) are constantly the same value irrespective of the value of an input variable that is included in the input specification information. X takes a value ranging from 2 to the maximum number of the steps, which indicates the number of the steps. Then, if the VAR_X and the VAR_(X−1) have the same value, the equivalent step checking unit 19 determines that step X and step (X−1) are the equivalent steps. If there is a case where the VAR_X and the VAR_(X−1) do not have the same value, the equivalent step checking unit 19 determines that step X and step (X−1) are inequivalent. After the equivalent step checking unit 19 has executed the checking from a first step until reaching the maximum number of the steps, the equivalent step checking unit 19 proceeds to step S107.

In step S107, the test case generation unit 20 sets a variable i to 1, and then proceeds to step S108.

In step S108, the test case generation unit 20 determines whether the value of the variable i is larger than the maximum number of the steps or whether there is a coverage target portion. If the value of the variable i is larger than the maximum number of the steps, the step(s) for test case generation have been finished. Thus, the test case generation unit 20 finishes the procedure. If there is no coverage target portion even though the value of the variable i is equal to or less than the maximum number of the steps, the test case generation unit 20 determines that the test case generation is not necessary, and then finishes the procedure. Otherwise, the test case generation unit 20 proceeds to step S109.

In step S109, the test case generation unit 20 refers to a result of the equivalent step checking in step S106. If step i and step (i−1) have been determined to be equivalent steps, processes of step S110 and step S111 are not necessary. Thus, the test case generation unit 20 proceeds to step S112. If step i and step (i−1) are not the equivalent steps, or inequivalent steps, the test case generation unit 20 proceeds to step S110. However, if i=1, the test case generation unit 20 determines that step i and step (i−1) are constantly inequivalent because there is no result of equivalent step checking, and then proceeds to step S110.

In step S110, the test case generation unit 20 analyzes the coverage target portion that has not been covered yet until step (i−1) or the one or more coverage target portions extracted in step S104 if i=1, using the formal method, thereby generating the test case. Specifically, the test case generation unit 20 analyzes whether the input variable loaded by the program information input unit 15 can take an input value that passes the coverage target portion that has not been covered yet until step (i−1) or one of the one or more coverage target portions, and outputs the input value as the test case if there is the input value as mentioned above. If there is not the input value as a result of the analysis, the test case may not be generated in that step. Then, the test case generation unit 20 proceeds to step S111.

In step S111, if the test case has been generated in step S110, the test case generation unit 20 excludes, from the one or more coverage target portions, the portion that has been passed by the test case. Then, the test case generation unit 20 proceeds to step S112.

In step S112, the test case generation unit 20 increments the variable i by one, and then returns to step S108.

In this embodiment, the equivalent step checking unit 19 executes an equivalent step checkings from the first step until reaching the maximum number of the steps all at once, in step S106. As a variation example, it may be so arranged that the equivalent step checking unit 19 checks whether step i and step (i−1) are equivalent between step S108 and step S109, and the equivalent step checking, coverage target portion analysis, and test case generation are repeated for each step.

As described above, in this embodiment, the test case generation apparatus 10 analyzes the test target software, which is software to execute the process of one step for each input of a value, thereby generating a series of values that are input for a test of the software, as the test case. On that occasion of the generation, if the value of the state variable VAR after execution of one of the multiple steps that share the state variable VAR and the value of the state variable VAR after execution of the process of a different one step are equal, the equivalent step checking unit 19 determines that these two steps are equivalent steps. The test case generation unit 20 excludes one of the two steps that have been determined to be the equivalent steps by the equivalent step checking unit 19, and then analyzes the test target software, thereby generating the value to be included in the test case.

In this embodiment, the equivalent step checking unit 19 determines each combination of successive two steps of the multiple steps is constituted from the equivalent steps. The "one of the two steps that have been determined to be the equivalent steps by the equivalent step checking unit 19" is the step whose process is to be executed later out of the two steps that have been determined to be the equivalent steps by the equivalent step checking unit 19. That is, the test case generation unit 20 excludes the step whose process is to be executed later out of the two steps that have been determined to be the equivalent steps by the equivalent step checking unit 19, and then analyzes the test target software, thereby generating the value to be included in the test case.

In this embodiment, the test case generation unit 20 sequentially analyzes the test target software, step by step, excluding the one of the two steps determined to be the equivalent steps by the equivalent step checking unit 19 until the coverage criterion for the test of the test target software is satisfied, thereby generating the value to be included in the test case.

In this embodiment, the state variable extraction unit 16 analyzes the test target software to extract, out of the variables that are shared among the multiple steps and hold values according to the result of the process of each step, a second variable excluding a first variable, as the state variable VAR. The first variable makes the process of a subsequent step different according to whether the first variable reaches a threshold value. On that occasion, the state variable extraction unit 16 determines the first variable based on the information indicating the specification of the first variable, which has been input to the program information input unit 15. As a variation example, the state variable extraction unit 16 may determine the first variable by analyzing the test target software. In this embodiment, the counter variable corresponds to the first variable, and the state variable VAR corresponds to the second variable. The counter specification information corresponds to the information indicating the specification of the first variable.

The operations of the test case generation apparatus 10 will be described, using a specific example.

In the following example, a part of the program of test target software that is illustrated in FIG. 4 will be used. It is assumed in the specification of this program that a counter is indicated by cnt, input variables are indicated by b and c, and the maximum number of steps is 4. It is assumed that, as the structural coverage criterion for execution of a test, branch coverage is used.

The program information input unit 15 loads the program of the test target software, counter specification information, input specification information, and the maximum number of the steps. Though the program includes only two functions that are func and func_init in this example, the program may include a group of a plurality of functions or a plurality of files as well as one file where only one function has been described. As information on the counter to be incremented by one due to execution of one step for standing by until a state transition is made, a state variable indicated by the cnt is included in the counter specification information. Information on the input variables b and c of the program of the test target software is included in the input specification information. The maximum number of the steps is set to 4.

When these pieces of the information are loaded, the state variable extraction unit 16 extracts state variables that are included in the test target program. It is assumed herein that d and the cnt are extracted. The state variable extraction unit 16 identifies that, out of these state variables, the checking target state variable VAR is the d, based on the counter specification information.

The structure extraction unit 17 extracts, from the program of the test target software, a total of four portions as branch to be covered because there are two if statements and each if statement has two branches that are TRUE and FALSE. FIG. 5 indicates the branch to be covered with respect to the program illustrated in FIG. 4, by P1 to P4.

The wrapper function generation unit 18 generates a wrapper function for equivalent step checking. An example of this wrapper function is illustrated in FIG. 6. A distinction is made for each step, assuming that X=1, 2, 3, 4 and input values for the input variables b and c of the program of the test target software are indicated by b_X and c_X. The value of a checking target state variable after execution of each step is stored in the variable VAR_X. Last three ASSERT statements are an example of instructions for the equivalent step checking. These ASSERT statements are each an instruction for checking whether the checking target state variable VAR_X and a checking target state variable VAR_(X−1) are equal in a case where each of the input variables b and c can take every possible value.

The equivalent step checking unit 19 executes the checking by the formal method, using this wrapper function as an entry function. If a counterexample has been found for one of the ASSERT statements, the equivalent step checking unit 19 determines that steps where the counterexample has been found are not equivalent. For example, the final statement of the ASSERT statements is a statement to check that the value of the checking target state variable after execution of a third step and the value of the checking target variable after execution of a fourth step are equal. That is, the final statement of the ASSERT statements is a statement to check that the value of the checking target state variable remains unchanged even if any value is given to each of input variables b_1 to b_4 and input variables c_1 to c_4 for execution of the third step and execution of the fourth step. If the counterexample for this checking has been output, the value of the checking target state variable may be changed. Thus, the third step and the fourth step are determined not to be equivalent. If the counterexample is not output, the third step and the fourth step can be determined to be equivalent. It is assumed in this example that a first step and a second step are equivalent, and each of the other steps has no equivalent step.

In the first step, the test case generation unit 20 determines whether or not to perform analysis for test case generation, using a result of the checking by the equivalent step checking unit 19. Since the first step is determined to constantly have no equivalent step, the test case generation unit 20 performs the analysis of the coverage target portions extracted by the structure extraction unit 17 and performs the test case generation. This can generate a test case. If the generated test case satisfies the P4 in the coverage target portions illustrated in FIG. 5, the test case generation unit 20 excludes the P4 from the coverage target portions, and proceeds to the second step. Since the second step is equivalent to the first step based on the result of the equivalent step checking, analysis and test case generation are not necessary. Thus, the test case generation unit 20 immediately proceeds to the third step. Since the third step is a step that is inequivalent to the second step, the test case generation unit 20 performs analysis of the coverage target portions P1 to P3 and test case generation, as in the first step. This can generate a test case. If the P1 and the P3 have been covered, the remainder of the coverage target portions is the P2. The test case generation unit 20 proceeds to the fourth step, and performs analysis and test case generation, as in the third step. Since the maximum number of the steps is 4, the test case generation unit 20 does not perform any more process and finishes the processes.

By executing the equivalent step checking to determine equivalence between the steps and performing the analysis and the test case generation according to the result of the equivalent step checking as mentioned above, the analysis for the test case generation is not performed in the second step, and proceeding to the subsequent step can be made. An analysis time can be thereby reduced. If the equivalent step checking is not performed as compared with this case, the analysis and the test case generation are executed in each of the first step to the fourth step. As a result, there is no input value that newly passes the coverage target portions in the second step. Thus, the test case generation is performed, so that an unnecessary analysis time will be taken.

Further, by automatically determining the equivalence between the steps as described above, using the formal method, the need for performing an operation of manually changing the threshold value of the counter is eliminated. A test case generation time can be thereby kept in a practical time without altering the behavior of the test target software. Further, the following problem can be avoided. That is, by setting a counter value to an erroneous value when the counter value has been manually changed, a test case is generated for the program configured to behave differently from what to expect, so that an appropriate test case cannot be generated.

Description of Effects of this Embodiment

In this embodiment, with respect to the one of the two steps determined to be the equivalent steps, the process of analyzing the software to generate the value to be included in the test case is omitted. Therefore, a time to be taken for generation of the test case extending over the multiple steps can be reduced.

In this embodiment, the test case generation apparatus 10 to generate the test case extending over the multiple steps includes the equivalent step checking unit 19 and the test case generation unit 20. The equivalent step checking unit 19 checks whether an internal state is equivalent between the steps even if an arbitrary value is given as an input. Based on results sequentially obtained by the equivalent step checking unit 19 from the first step until reaching the maximum number of the steps in order, the test case generation unit 20 does not perform analysis for test case generation and the test case generation in the step if the step is equivalent to the immediately preceding step, and proceeds to the subsequent step. If the step is not equivalent to the immediately preceding step, the test case generation unit 20 performs the analysis and test case generation.

According to this embodiment, if each internal state has been determined to be equivalent between after execution of a certain step and after execution of a different step, analysis for automatic test case generation for that step is not performed. A time to be taken for the automatic test case generation can be thereby reduced. Further, by performing the automatic test case generation without altering the behavior of the test target software, the test suited for the test target software can be executed.

In this embodiment, when the internal state remains unchanged between after the execution of the certain step and after the execution of the different step even if the arbitrary value is given for the input to the program of the test target software in each step at a time of the automatic generation of the test case extending over the multiple steps, those two steps are determined to be equivalent. Then, the analysis for the automatic generation of the test case in the step is omitted.

In this embodiment, before the analysis for the test case generation for each step, it is checked whether the internal state variables omitting the counter in each of the steps and the immediately preceding step are constantly equivalent for every input value. In the step determined to be equivalent to the immediately preceding step, the analysis for the test case generation and the generation that require time are not performed. The time necessary for the test case generation can be thereby reduced.

In this embodiment, by automatically determining whether or not a certain step and the immediately preceding step are equivalent by the formal method, the cost for the manual change is reduced, and at the same time, the following problem can be solved: the problem being in that a satisfactory test case cannot be generated as a result of erroneous manual change and therefore the test cannot be appropriately executed.

In this embodiment, the variable whereby the process of the test target software is changed by reaching the threshold value is not included in the state variable. Specifically, even in the program including a state variable configured to change for each step in order to make the program stand by for a certain period of time until a state transition occurs, by using the state variable excluding the counter for the equivalent step checking, it can be determined that the steps during the standby are equivalent steps. The time to be taken for the test case generation can be thereby reduced.

In this embodiment, the variable whereby the process of the test target software is to be changed by reaching the threshold value is automatically extracted from the specification information that has been formally described, or is automatically extracted by the operation analysis of the program of the test target software. Specifically, by extracting the counter specification information including the counter that is the state variable to be excluded from the equivalent step checking target by referring to the specification formally written or by the analysis of the program of the test target software, the work of manually setting the counter specification information is omitted. The time to be taken for the test case generation can be thereby reduced.

*Alternative Configuration*

In this embodiment, the functions of the program information input unit 15, the state variable extraction unit 16, the structure extraction unit 17, the wrapper function generation unit 18, the equivalent step checking unit 19, and the test case generation unit 20 are implemented by the software. As a variation example, the functions of the program information input unit 15, the state variable extraction unit 16, the structure extraction unit 17, the wrapper function generation unit 18, the equivalent step checking unit 19, and the test case generation unit 20 may be implemented by a combination of software and hardware. That is, a part of the functions of the program information input unit 15, the state variable extraction unit 16, the structure extraction unit 17, the wrapper function generation unit 18, the equivalent step checking unit 19, and the test case generation unit 20 may be implemented by dedicated hardware, and the remainder of the functions of the program information input unit 15, the state variable extraction unit 16, the structure extraction unit 17, the wrapper function generation unit 18, the equivalent step checking unit 19, and the test case generation unit 20 may be implemented by the software.

The dedicated hardware is a single circuit, a composite circuit, a programmed processor, a parallel-programmed processor, a logic IC, a GA, an FPGA, an ASIC, or a combination of some or all of these pieces of the hardware, for example. "IC" is an abbreviation for Integrated Circuit. "GA" is an abbreviation for Gate Array. "FPGA" is an abbreviation for Field-Programmable Gate Array. "ASIC" is an abbreviation for Application Specific Integrated Circuit.

Both of the processor 11 and the dedicated hardware are processing circuitry. That is, irrespective of whether the functions of the program information input unit 15, the state variable extraction unit 16, the structure extraction unit 17, the wrapper function generation unit 18, the equivalent step checking unit 19, and the test case generation unit 20 are implemented by the software or the combination of the software and the hardware, the operations of the program information input unit 15, the state variable extraction unit 16, the structure extraction unit 17, the wrapper function generation unit 18, the equivalent step checking unit 19, and the test case generation unit 20 are implemented by the processing circuitry.

Second Embodiment

In this embodiment, a difference from the first embodiment will be mainly described using FIGS. 7 to 12.

\*\*\*Description of Configuration\*\*\*

Since a configuration of a test case generation apparatus 10 according to this embodiment is the same as that in the first embodiment illustrated in FIG. 1, a description of the configuration of the test case generation apparatus 10 will be omitted.

\*\*\*Description of Operations\*\*\*

An overview of operations of the test case generation apparatus 10 according to this embodiment will be described with reference to FIG. 12. The operations of the test case generation apparatus 10 correspond to a test case generation method according to this embodiment.

A program information input unit 15 loads, from a memory 12 or from an outside via a communication device 13 or an input/output device 14, the program of test target software, feedback control specification information, input specification information, and information of the maximum number of steps.

A state variable extraction unit 16 analyzes the program loaded by the program information input unit 15, extracts state variables that are included in the program, and stores the state variables in the memory 12. The state variable extraction unit 16 distinguishes, among the extracted state variables, the variable which indicates a feedback control amount, based on the feedback control specification information loaded by the program information input unit 15. Thereafter, this variable will be referred to as a state variable CTRL. One or more state variables excluding the state variable CTRL will be referred to as a state variable VAR.

A wrapper function generation unit 18 calls the test target program and generates a wrapper function for storing each of the value of the state variable VAR and the value of the state variable CTRL after execution of each step as a variable that is different for each step. It is assumed in this embodiment that the variable that has stored the value of the state variable VAR after execution of an Xth step will be indicated by VAR_X, and the variable that has stored the value of the state variable CTRL will be indicated by CTRL_X.

An equivalent step checking unit 19 checks whether execution of a certain step and execution of a different step are functionally equivalent, by the formal method. If the VAR_X after execution of a certain step X and the VAR_Y after execution of step Y have constantly the same value, the equivalent step checking unit 19 determines that step X and step Y are equivalent steps with respect to the state variable VAR. It is assumed, however, that X and Y are values that are different to each other and are each a value not less than 1 and not more than the maximum number of the steps. The equivalent step checking unit 19 performs similar checking with respect to the state variable CTRL as well. If the VAR_X and the VAR_Y are equal with respect to all the state variables and the CTRL_X and CTRL_Y are equal with respect to all the state variables, or the state variable VAR and the state variable CTRL, after execution of step X and step Y, the equivalent step checking unit 19 determines that step X and step Y are completely equivalent steps.

A test case generation unit 20 generates, by the formal method, a test case configured to cover one or more coverage targets extracted by a structure extraction unit 17 according to a result obtained by the equivalent step checking unit 19, and outputs the test case.

Figure 7:
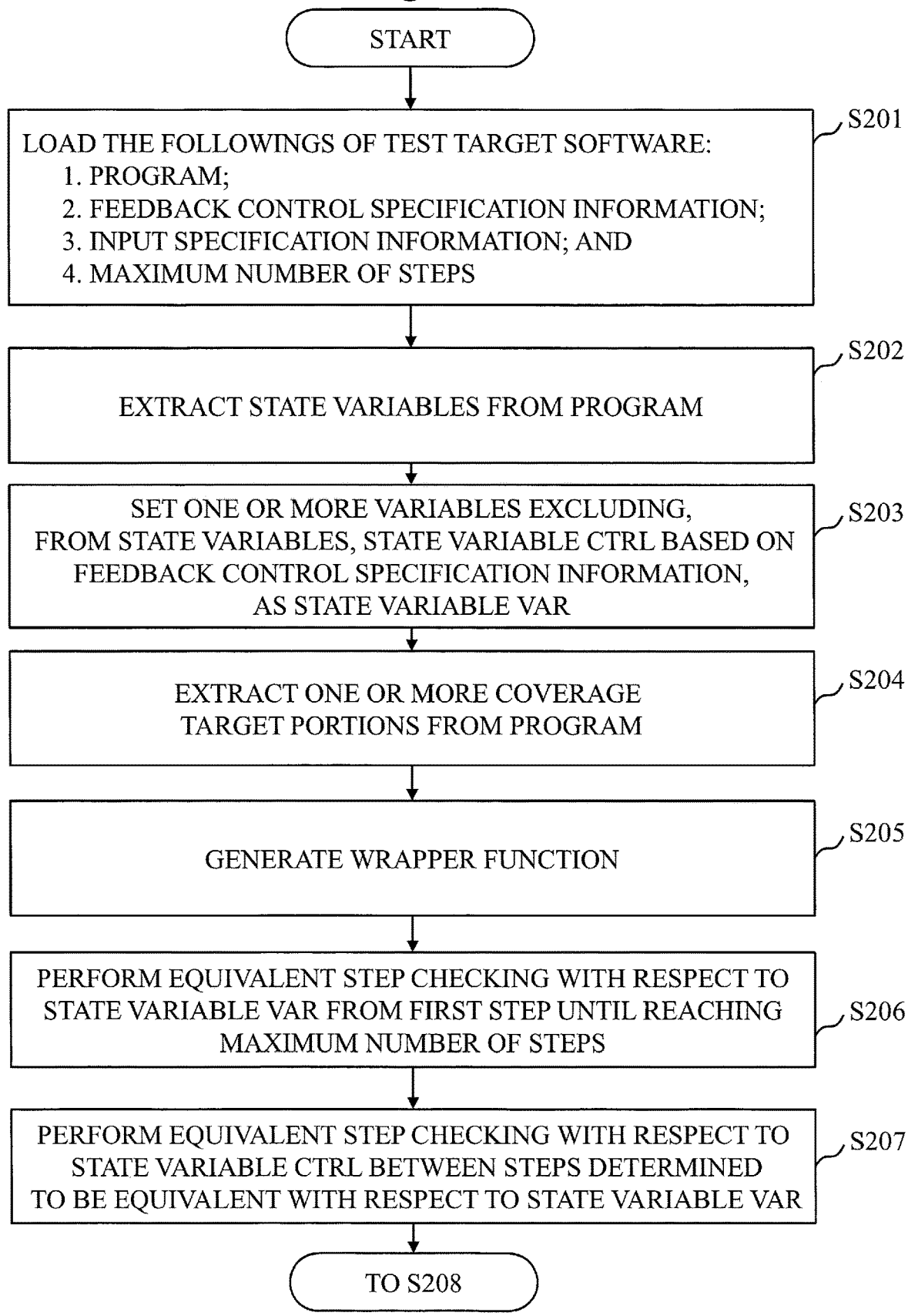
FIG. 7 is a flowchart illustrating operations of a test case generation apparatus according to a second embodiment.
Figure 8:
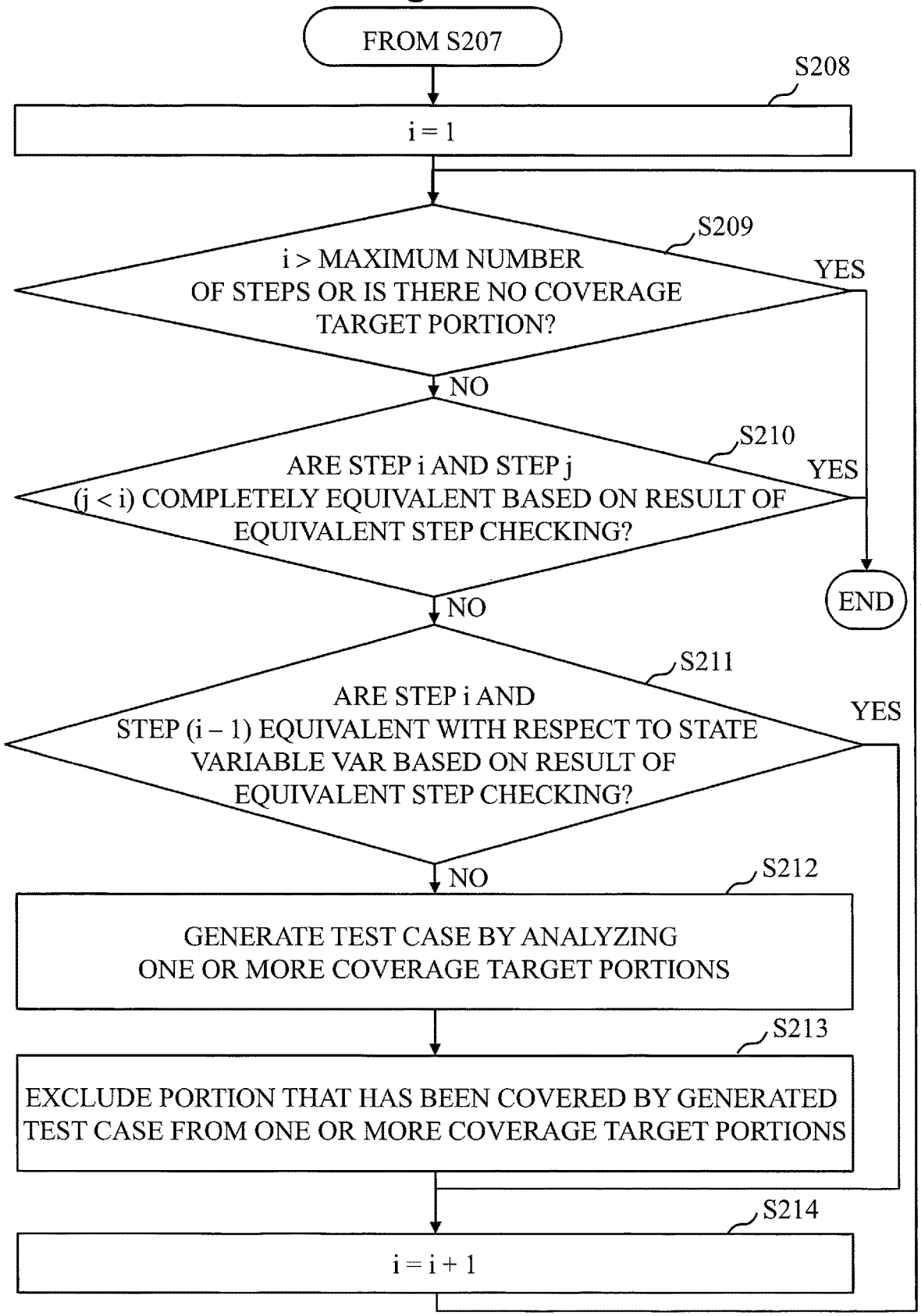
FIG. 8 is a flowchart illustrating operations of the test case generation apparatus according to the second embodiment.

Details of the operations of the test case generation apparatus 10 according to this embodiment will be described with reference to FIGS. 7 and 8.

In step S201, the program information input unit 15 loads the program of the test target software, the feedback control specification information, the input specification information, and the maximum number of the steps, and then proceeds to step S202. The feedback control specification information may be manually set by a user based on a software specification, may be automatically set, using a specification described in a defined format, or may be set by analyzing the program to automatically select a variable that is used as a trigger for a state transition.

In step S202, the state variable extraction unit 16 analyzes the loaded program, extracts the state variables that are included in the program, and proceeds to step S203.

In step S203, the state variable extraction unit 16 sets, out of the extracted variables, one or more variables excluding the state variable CTRL indicated by the feedback control specification information as the state variable VAR, and then proceeds to step S204. The state variable CTRL is the variable indicating the feedback control amount. The state variable CTRL is, for example, a variable in a program to calculate a control amount of a motor to be controlled or the like, for storing a result of the calculation. When control amount is calculated in a certain step, the state variable CTRL is employed when the control amount in a previous step is used or the like. This variable is used for suppressing an abrupt change of the motor control amount or the like and thereby implementing smooth control or the like.

In step S204, the structure extraction unit 17 extracts the one or more coverage target portions that are included in the program of the test target software according to the structural coverage criterion to be used, and then proceeds to step S205. Since step S204 has no dependency with each of step S202, step S203, and step S205, step S204 can be executed by changing the execution order of step S204 or can be executed in parallel with one of step S202, step S203, and step S205.

In step S205, the wrapper function generation unit 18 generates the wrapper function for the equivalent step checking, and then proceeds to step S206.

In step S206, the equivalent step checking unit 19 checks equivalence between the steps with respect to the state variable VAR, by the formal method, using the wrapper function as an entry function. Specifically, the equivalent step checking unit 19 checks whether or not the value of the state variable VAR_X after execution of step X and the value of the state variable VAR_Y after execution of step Y are constantly the same value irrespective of the value of an input variable that is included in the input specification information. X and Y take values that are mutually different and each take a value ranging from 1 to the maximum number of the steps, which indicates the number of the steps.

Then, if the VAR_X and the VAR_Y have the same value, the equivalent step checking unit 19 determines that step X and step Y are equivalent steps with respect to the state variable VAR. If there is a case where the VAR_X and the VAR_Y do not have the same value, the equivalent step checking unit 19 determines that step X and step Y are inequivalent. After the equivalent step checking unit 19 executes the checking from the first step until reaching the maximum number of the steps, the equivalent step checking unit 19 proceeds to step S207.

In step S207, the equivalent step checking unit 19 checks whether the steps determined to be equivalent with respect to the state variable VAR are equivalent with respect to the state variable CTRL as well, or the complexly equivalent steps. If the VAR_X and the VARY are equal and step X and step Y are determined to be equivalent with respect to the state variable VAR, for example, the equivalent step checking unit 19 checks whether the CTRL_X and the CTRL_Y also have the same value, so that step X and step Y become the completely equivalent steps. Thereafter, the equivalent step checking unit 19 proceeds to step S208.

In step S208, the test case generation unit 20 sets a variable i to 1, and then proceeds to step S209.

In step S209, the test case generation unit 20 determines whether the value of the variable i is larger than the maximum number of the steps or whether there is a coverage target portion. If the value of the variable i is larger than the maximum number of the steps, the step(s) for test case generation have been finished. Thus, the test case generation unit 20 finishes the procedure. If there is no coverage target portion even though the value of the variable i is equal to or less than the maximum number of the steps, the test case generation unit 20 determines that the test case generation is not necessary, and then finishes the procedure. Otherwise, the test case generation unit 20 proceeds to step S210.

In step S210, the test case generation unit 20 refers to a result of the equivalent step checking in step S207. The test case generation unit 20 checks whether step j that is completely equivalent to step i is present. j is a value smaller than i. If there is step j that is completely equivalent to step i, the test case generation unit 20 determines that all state transitions have been executed, and then finishes the procedure. If there is not step j that is completely equivalent to step i, the test case generation unit 20 determines that there is a state that has not been reached, and then proceeds to step S211.

In step S211, the test case generation unit 20 refers to the result of the equivalent step checking with respect to the state variable VAR in step S206. If step i and step (i−1) have been determined to be the equivalent steps, processes of step S212 and step S213 are not necessary. Thus, the test case generation unit 20 proceeds to step S214. If step i and step (i−1) are not the equivalent steps, or inequivalent steps, even with respect to the state variable VAR, the test case generation unit 20 proceeds to step S212. However, if i=1, the test case generation unit 20 determines that step i and step (i−1) are constantly inequivalent because there is no result of equivalent step checking, and then proceeds to step S212.

In step S212, the test case generation unit 20 analyzes the coverage target portion that has not been covered yet until step (i−1) or the one or more coverage target portions extracted in step S204 if i=1, using the formal method, thereby generating the test case. Specifically, the test case generation unit 20 analyzes whether the input variable loaded by the program information input unit 15 can take an input value that passes the coverage target portion that has not been covered yet until step (i−1) or one of the one or more coverage target portions, and outputs the input value as the test case if there is the input value as mentioned above. If there is not the input value as a result of the analysis, the test case may not be generated at that step. Then, the test case generation unit 20 proceeds to step S213.

In step S213, if the test case has been generated in step S212, the test case generation unit 20 excludes, from the one or more coverage target portions, the portion that has been passed by the test case. Then, the test case generation unit 20 proceeds to step S214.

In step S214, the test case generation unit 20 increments the variable i by one, and then proceeds to step S209.

As described above, in this embodiment, the state variable extraction unit 16 analyzes the test target software, thereby extracting, out of the variables that are shared among the multiple steps and hold values according to the result of the process of each step, a second variable excluding a first variable, as the state variable VAR. The first variable makes the process of a subsequent step different according to whether the first variable reaches a threshold value. On that occasion, the state variable extraction unit 16 determines the first variable based on information indicating the specification of the first variable, which has been input by the program information input unit 15. As a variation example, the state variable extraction unit 16 may determine the first variable by analyzing the test target software. In this embodiment, the state variable CTRL corresponds to the first variable, and the state variable VAR corresponds to the second variable. The feedback control specification information corresponds to the information indicating the specification of the first variable.

In this embodiment, when values of the state variable VAR and the state variable CTRL after execution of one of the multiple steps are respectively equal to values of the state variable VAR and the state variable CTRL after execution of the process of a different one step with respect to both of the state variable VAR and the state variable CTRL, the equivalent step checking unit 19 determines that those two steps are completely equivalent steps. That is, the equivalent step checking unit 19 determines whether each combination of two steps obtained from the multiple steps is constituted from the completely equivalent steps. The test case generation unit 20 sequentially analyzes the test target software, step by step, excluding one of the two steps that have been determined to be the equivalent steps by the equivalent step checking unit 19 until arriving at the step out of the two steps determined to be the completely equivalent steps by the equivalent step checking unit 19, of which the step is to be executed later, thereby generating a value to be included in the test case.

Operations of the test case generation apparatus 10 will be described by using a specific example.

In the following example, a part of the program of test target software that is illustrated in FIG. 9 will be used. It is assumed in the specification of this program that the variable indicating the feedback control amount is indicated by a, input variables are indicated by b and c, and the maximum number of steps is 5. It is assumed that, as the structural coverage criterion for execution of a test, branch coverage is used.

The program information input unit 15 loads the program of the test target software, feedback control specification information, input specification information, and information of the maximum number of the steps. The feedback control specification information includes the state variable a. The input specification information includes information on the input variables b and c in the program of the test target software. The maximum number of the step is set to 5.

When these pieces of the information are loaded, the state variable extraction unit 16 extracts the state variables included in the test target program. It is assumed herein that the a and d are extracted. The state variable extraction unit 16 identifies that the state variable VAR is the d and the state variable CTRL is the a, based on the feedback control specification information.

Since there is one if statement and the if statement has two branches that are TRUE and FALSE, the structure extraction unit 17 extracts, from the program of the test target software, at least these two portions as branch to be covered. FIG. 10 indicates the branch to be covered with respect to the program illustrated in FIG. 9, by P1 and P2. It is assumed that a different coverage portion is also included in the program that is omitted.

The wrapper function generation unit 18 generates each wrapper function for equivalent step checking. An example of this wrapper function is illustrated in FIGS. 11 and 12. A distinction is made for each step assuming that X=1, 2, 3, 4, and 5 and input values for the input variables b and c of the program of the test target software are indicated by b_X and c_X. Last 20 lines of ASSERT statements are instructions for executing the equivalent step checking between the respective steps with respect to the state variable VAR and the equivalent step checking between the respective steps with respect to the state variable CTRL. The instructions are all described herein in order to generate the wrapper functions once.

The equivalent step checking unit 19 executes the equivalent step checking with respect to the state variable VAR for each of first 10 lines of the ASSERT statements by the formal method, using this wrapper function as an entry function. It is assumed in this example that counterexamples have been found for the checkings with respect to the ASSSERT statements including VAR_3 and therefore the steps are determined to be inequivalent with respect to the VAR_3 and that the remainder of the ASSERT statements have no counterexamples. That is, it is assumed that a first step, a second step, a fourth step, and a fifth step are equivalent with respect to the state variable VAR, and that only a third step is inequivalent to the other steps. The equivalent step checking unit 19 checks whether these four steps are equivalent with respect to the state variable CTRL as well and are completely equivalent steps. The ASSERT statements to be used for this checking are statements not including CTRL_3 in final 10 lines. It is assumed in this example that no counterexamples are found for the checking with respect to the ASSERT statements for checking that CTRL_1 is constantly equal to CTRL_4 and that CTRL_2 is constantly equal to CTRL_5, and a counterexample is found for each of the remainder of the ASSERT statements. That is, the first step and the fourth step are the completely equivalent steps with respect to each state variable even if any input value is input to each of the first step and the fourth step for execution, and the second step and the fifth step are the completely equivalent steps with respect to each state variable are equivalent even if any input value is input to each of the second step and the fifth step for execution.

In the first step, the test case generation unit 20 determines whether or not to perform analysis for test case generation, using the results of the checkings by the equivalent step checking unit 19. Since the first step is determined to constantly have no inequivalent step, the test case generation unit 20 performs the analysis of the coverage target portions extracted by the structure extraction unit 17 and performs the test case generation. This can generate a test case. If the generated test case satisfies one of the coverage target portions illustrated in FIG. 10, the test case generation unit 20 excludes that portion from the coverage target portions, and then proceeds to the second step. It is assumed in this example that only the coverage target portion P2 is excluded and the P1 remains as the coverage target portion. The test case generation unit 20 checks whether the second step is a step that is completely equivalent to the first step by referring to the result of the equivalent step checking. Since the second step is not completely equivalent to the first step, the test case generation unit 20 checks whether the second step is equivalent to the first step with respect to the state variable VAR. Since the second step is equivalent to the first step with respect to the state variable VAR, analysis and test case generation are not necessary. Thus, the test case generation unit 20 immediately proceeds to the third step. The third step has no completely equivalent step and has no step that is equivalent with respect to the state variable VAR. Therefore, the test case generation unit 20 performs analysis and test case generation. This can generate a test case. If the generated test case passes one of the coverage target portions illustrated in FIG. 10, that coverage target portion is excluded from the coverage target portions, and then, the test case generation unit 20 proceeds to the fourth step. It is assumed in this example that though the coverage target portion P1 has been covered in the third step, the different coverage target portion remains. The test case generation unit 20 checks whether the fourth step is completely equivalent to each of the first to third steps by referring to the results of the equivalent step checkings. Since the fourth step can be checked to be equivalent to the first step, the test case generation unit 20 determines that every transitionable state has been executed and finishes the processes.

Description of Effect of Embodiment

In this embodiment, when it is determined that every possible state has been reached before reaching the maximum number of the steps in the test target software whose states are looped, the processes are finished even if there remains the coverage target portion that has not been covered. That is, when a certain step is equivalent to the step which is previous to that step after execution of the process of that step, the processes are finished before reaching the maximum step. Due to this arrangement, unnecessary analysis for test case generation is not performed, so that an analysis time can be reduced more than in a case where analysis is performed until the maximum number of the steps is reached. The coverage target portion that has not been covered is a portion that is included when a code, which is inexecutable even if any value is input, such as a dead code is present.

REFERENCE SIGNS LIST

10: test case generation apparatus; 11: processor; 12: memory; 13: communication device; 14: input/output device; 15: program information input unit; 16: state variable extraction unit; 17: structure extraction unit; 18: wrapper function generation unit; 19: equivalent step checking unit; 20: test case generation unit.

The invention claimed is:

1. A test case generation apparatus to generate test cases extending over a plurality of steps for embedded real-time software where an input from an external apparatus changes between the steps, a generated test case executing a process of one step for each input of a value, thereby generating, as the test case, a sequence of values that are input for a test of the software, the test case generation apparatus comprising:
processing circuitry configured
to acquire a program of a target software to be tested,
to extract state variables included in the program, the extracted state variables including at least a first target state variable being a variable shared among processes of a plurality of steps and holds a value according to an execution result of a process in each step as the processes of the plurality of steps are sequentially executed,
to extract one or more target portions of the target software to be tested,
to call the one or more target portions and generate a wrapper function storing a value of the first target state variable after execution of each step as a variable that is different for each step,
to determine, when the value of the first target state variable after execution of one of the plurality of steps and the value of the first target state variable after execution of a different step are equal, those two steps are equivalent steps, and
to generate a test case configured to cover the one or more target portions by excluding one of the two steps determined to be the equivalent steps and generating input values for those steps of the plurality of steps not determined to be equivalent as input values to be included in the test case,
wherein the extracted state variables includes a control state variable that makes the process executed in a subsequent step of the plurality of steps different according to whether the control state variable reaches a threshold value, and
the processing circuitry acquires counter specification information and determines the control state variable based on the acquired counter specification information.

2. The test case generation apparatus according to claim 1, wherein the processing circuitry is configured to analyze the target software, thereby determining the control state variable.

3. The test case generation apparatus according to claim 1, wherein the processing circuitry
determines whether each combination of two successive steps of the plurality of steps are equivalent steps, and
excludes the step whose process is to be executed later out of the two successive steps determined to be equivalent when generating the input values to be included in the generated test case.

4. The test case generation apparatus according to claim 1, wherein the processing circuitry
determines that, with respect to both of the first target state variable and the control state variable, when values of the first target state variable and the control state variable after execution of one of the plurality of steps are respectively equal to values of the first target state variable and the control state variable after execution of a different step, those two steps are completely equivalent steps, and
until arriving at the step whose process is to be executed later out of the two steps determined to be the completely equivalent steps, sequentially analyzes the software excluding the one of the two steps determined to be the equivalent steps, step by step, when generating the input values to be included in the generated test case.

5. A test case generation method for generating test cases extending over a plurality of steps for embedded real-time software where an input from an external apparatus changes between the steps, a generated test case executing a process of one step for each input of a value, thereby generating, as a test case, a sequence of values that are input for a test of the software, the test case generation method comprising:
acquiring a program of a target software to be tested;
extracting state variables included in the program, the extracted state variables including at least a first target state variable being a variable shared among processes of a plurality of steps and holds a value according to an execution result of a process in each step as the processes of the plurality of steps are sequentially executed;
extracting one or more target portions of the target software to be tested,
calling the one or more target portions and generating a wrapper function storing a value of the first target state variable after execution of each step as a variable that is different for each step,
determining, when the value of the first target state variable after execution of one of the plurality of steps and the value of the first target state variable after execution of a different step are equal, those two steps are equivalent steps; and
generating a test case configured to cover the one or more target portions by excluding one of the two steps determined to be the equivalent steps and generating input values for those steps of the plurality of steps not determined to be equivalent as input values included in the test case,
wherein the extracted state variables includes a control state variable that makes the process executed in a subsequent step of the plurality of steps different according to whether the control state variable reaches a threshold value, and
the test case generation method further comprises acquiring counter specification information and determining the control state variable based on the acquired counter specification information.

6. A non-transitory computer readable medium storing a test case generation program for generating test cases extending over a plurality of steps for embedded real-time software where an input from an external apparatus changes between the steps, a generated test case executing a process of one step for each input of a value, thereby generating, as the test case, a sequence of values that are input for a test of the software, the test case generation program causing a computer to execute:
an acquisition procedure of acquiring a program of a target software to be tested;
an extraction procedure of extracting state variables included in the program, the extracted state variables including at least a first target state variable being a variable shared among processes of a plurality of steps and holds a value according to an execution result of a process in each step as the processes of the plurality of steps are sequentially executed;
an equivalent step checking procedure of determining, when the value of the first target state variable after execution of one of the plurality of steps and the value of the first target state variable after execution of a different step are equal, those two steps are equivalent steps; and
a test case generation procedure of generating a test case configured to cover the one or more target portions by excluding one of the two steps determined to be the equivalent steps by the equivalent step checking procedure and generating input values for those steps of the plurality of steps not determined to be equivalent as input values included in the test case, wherein the extracted state variables includes a control state variable that makes the process executed in a subsequent step of the plurality of steps different according to whether the control state variable reaches a threshold value, and the test case generation program causes the computer to further execute an acquisition procedure of acquiring counter specification information and determining the control state variable based on the acquired counter specification information.

* * * * *